(12) United States Patent
Ake

(10) Patent No.: US 9,280,924 B2
(45) Date of Patent: Mar. 8, 2016

(54) DISPLAY DEVICE AND METHOD THAT DIVIDES ONE FRAME PERIOD INTO A PLURALITY OF SUBFRAME PERIODS AND THAT DISPLAYS SCREENS OF DIFFERENT COLORS IN ACCORDANCE WITH THE SUBFRAME PERIODS

(71) Applicant: Sharp Kabushiki Kaisha, Osaka-shi, Osaka (JP)

(72) Inventor: Yasunori Ake, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/353,313

(22) PCT Filed: Feb. 12, 2013

(86) PCT No.: PCT/JP2013/053195
§ 371 (c)(1),
(2) Date: Apr. 22, 2014

(87) PCT Pub. No.: WO2013/125384
PCT Pub. Date: Aug. 29, 2013

(65) Prior Publication Data
US 2014/0354712 A1    Dec. 4, 2014

(30) Foreign Application Priority Data

Feb. 22, 2012    (JP) ................... 2012-035806

(51) Int. Cl.
*G09G 3/36* (2006.01)
*G09G 3/20* (2006.01)
(Continued)

(52) U.S. Cl.
CPC ........ *G09G 3/2003* (2013.01); *G02F 1/133603* (2013.01); *G09G 3/3406* (2013.01); *G02F 2001/133622* (2013.01); *G09G 2310/0235* (2013.01)

(58) Field of Classification Search
CPC .................................. G09G 3/3413

USPC .......................................... 345/102
See application file for complete search history.

(56) References Cited

U.S. PATENT DOCUMENTS

| 6,151,004 A | 11/2000 | Kaneko |
| 2007/0070023 A1 | 3/2007 | Yasuda et al. |

(Continued)

FOREIGN PATENT DOCUMENTS

| JP | H1063225 A | 3/1998 |
| JP | 2007-093651 A | 4/2007 |

(Continued)

OTHER PUBLICATIONS

International Search Report PCT/ISA/210 for International Application No. PCT/JP2013/053195 Dated Mar. 7, 2013.

(Continued)

*Primary Examiner* — Roy Rabindranath
(74) *Attorney, Agent, or Firm* — Harness, Dickey & Pierce, P.L.C.

(57) ABSTRACT

A display device that adopts a field sequential method and that is capable of achieving desired luminance while suppressing mixing of colors is provided. With respect to display of each color by a liquid crystal display device adopting a field sequential method, a period is provided for which light sources of each color remain turned on until a turning-off delay time has elapsed since an end timing of a subframe period. The turning-off delay time relating to LEDs for which an off state begins in a preceding subframe period is configured in such a way as to be shorter than a turning-on delay time relating to LEDs for which an on state begins in a succeeding subframe period. As a result, an all-off period, in which LEDs of all colors are in the off state, is provided between on periods of two colors.

5 Claims, 7 Drawing Sheets

(51) Int. Cl.
*G09G 3/34* (2006.01)
*G02F 1/1335* (2006.01)

(56) References Cited

U.S. PATENT DOCUMENTS

| | | |
|---|---|---|
| 2007/0176943 A1 | 8/2007 | Cho |
| 2009/0015525 A1 | 1/2009 | Hosaka et al. |
| 2009/0058794 A1* | 3/2009 | Iwamoto ................ 345/102 |
| 2009/0066621 A1 | 3/2009 | Iwamoto et al. |
| 2009/0115720 A1* | 5/2009 | Inada et al. ............. 345/102 |
| 2011/0267384 A1* | 11/2011 | Fujiwara et al. ........ 345/690 |

FOREIGN PATENT DOCUMENTS

| | | |
|---|---|---|
| JP | 2007-206698 A | 8/2007 |
| JP | 2008-096927 A | 4/2008 |
| JP | 2009-020385 A | 1/2009 |
| JP | 2009-063878 A | 3/2009 |
| WO | WO-2011-058728 A1 | 5/2011 |

OTHER PUBLICATIONS

Written Opinion of the International Searching Authority PCT/ISA/237 for International Application No. PCT/JP2013/053195 dated Mar. 7, 2013.

* cited by examiner

DISPLAY DEVICE AND METHOD THAT DIVIDES ONE FRAME PERIOD INTO A PLURALITY OF SUBFRAME PERIODS AND THAT DISPLAYS SCREENS OF DIFFERENT COLORS IN ACCORDANCE WITH THE SUBFRAME PERIODS

TECHNICAL FIELD

The present invention relates to a display device, and, more particularly, to a display device that performs color display using a field sequential method and a method for driving the display device.

BACKGROUND ART

A liquid crystal display device that performs color display typically includes color filters that pass red (R), green (G), and blue (B) light in correspondence with sub-pixels obtained by dividing each pixel into three. Because, however, about two-thirds of backlight radiated onto a liquid crystal display panel is absorbed by the color filters, there is a problem in that the light use efficiency of a liquid crystal display device adopting a color filter method is low. Therefore, liquid crystal display devices adopting a field sequential method, which perform color display without using color filters, are attracting attention.

In the field sequential method, one frame period, which is a period in which one screen is displayed, is divided into three subframe periods. In a first subframe period, a red component of an input signal is input and a red screen is displayed by turning on red light sources. In a second subframe period, a green component is input and a green screen is displayed by turning on green light sources. In a third subframe period, a blue component is input and a blue screen is displayed by turning on blue light sources. As a result, a color image is displayed on a liquid crystal panel. Thus, since color filters are not necessary in a liquid crystal display device adopting the field sequential method, the light use efficiency of a liquid crystal display device adopting the field sequential method is three times as high as that of a liquid crystal display device adopting the color filter method. In addition, because, for example, the number of pixels in a liquid crystal display device adopting the field sequential method can be one-third that in a liquid crystal display device adopting the color filter method, an aperture ratio can be increased.

Now, the optical response speed of liquid crystal is relatively low. Therefore, in a liquid crystal display device adopting the field sequential method, the light transmittance (hereinafter simply referred to as "transmittance") of liquid crystal at an end of a previous subframe period more or less continues (hereinafter simply referred to as "transmittance continues") for a while after the subframe period is switched. A subframe period before switching will be referred to as a "preceding subframe period", and a subframe period after switching, that is, a subframe period immediately after a preceding subframe period, will be referred to as a "succeeding subframe period" herein. If light sources of a color corresponding to a succeeding subframe period are turned on at a beginning of the succeeding subframe period, desired luminance is not achieved because transmittance in a preceding subframe period is continuing. Such a phenomenon is generally called "mixing of colors".

Therefore, for example, as illustrated in FIG. 6, a method (hereinafter referred to as a "first existing method") is known in which a timing at which light sources corresponding to each subframe period are turned on is delayed, for example, by a period within which liquid crystal can sufficiently respond while keeping a timing at which the light sources are turned off the same. According to the first existing method, in a period in which transmittance in a preceding subframe continues, which is immediately after the beginning of a succeeding subframe period, light sources of a color corresponding to the succeeding subframe period are not turned on. Therefore, mixing of colors is suppressed. The method illustrated in FIG. 6 is disclosed, for example, in PTL 1, PTL 2, and the like.

In addition, for example, as illustrated in FIG. 7, a method (hereinafter referred to as a "second existing method") is known in which both the timing at which the light sources corresponding to each subframe period are turned on and the timing at which the light sources are turned off are delayed, for example, by the period within which liquid crystal can sufficiently respond. According to the second existing method, in the period in which transmittance in a preceding subframe period continues, which is immediately after the beginning of a succeeding subframe period, light sources of a color corresponding to the preceding subframe period remain turned on. Therefore, achieved luminance can be close to a desired value. The luminance here corresponds to a time integral of an on period of the light sources of each color and transmittance in the on period. The method illustrated in FIG. 7 is disclosed, for example, in PTL 2 and the like.

CITATION LIST

Patent Literature

PTL 1: Japanese Unexamined Patent Application Publication No. 2007-206698

PTL 2: Japanese Unexamined Patent Application Publication No. 10-63225

SUMMARY OF INVENTION

Technical Problem

Now, since the on period of the light sources of each color is short in the first existing method, it is difficult to achieve desired luminance. On the other hand, since the on period of the light sources of each color is not short in the second existing method, desired luminance can be achieved. However, since the on period of the light sources of each color is continuous with the on period of the light sources of another color, the light sources of a color corresponding to a succeeding subframe period are turned on immediately after a period in which the light sources of a color corresponding to a preceding subframe period remain turned on during the succeeding subframe period. Since transmittance in the preceding subframe period is assumed to be more or less continuing at this point of time, a period in which a color corresponding to the transmittance and the color of the light sources is caused when the light sources of the color corresponding to the succeeding subframe period have been turned on. Therefore, mixing of colors is likely to occur in the second existing method compared to the first existing method.

Therefore, an object of the present invention is to provide a display device that adopts the field sequential method and that is capable of achieving desired luminance while suppressing mixing of colors and a method for driving the display device.

Solution to Problem

A first aspect of the present invention is a display device that divides one frame period into a plurality of subframe periods and that displays screens of different colors in accordance with the subframe periods.

The display device includes a display unit that includes a plurality of pixel forming units arranged in a matrix, a light source unit for radiating light onto the display unit, the light source unit including light sources of a plurality of colors capable of controlling an on/off state for each color, and a light source control unit that controls states of the light sources of the plurality of colors.

The light source control unit delays a timing at which the on state of the light sources of each color begins from a start timing of a subframe period in which a screen is to be displayed by controlling transmittance of light relating to each color by a first delay time.

The light source control unit delays a timing at which the off state of the light sources of each color begins from an end timing of the subframe period in which the screen is to be displayed by controlling the transmittance of the light relating to each color by a second delay time.

The second delay time for delaying the timing at which the off state of the light sources of each color begins is configured in such a way to be shorter than the first delay time for delaying the timing at which the on state of the light sources of a succeeding color, which are to be turned on after the light sources of the foregoing color are turned off, begins.

A second aspect of the present invention is the display device according to the first aspect of the present invention.

The light source control unit is configured in such a way as to make a length of an on period of the light sources determined by the first delay time and the second delay time variable.

A third aspect of the present invention is the display device according to the second aspect of the present invention.

The light source control unit is configured in such a way as to be able to make the on period different between the light sources of the plurality of colors.

A fourth aspect of the present invention is the display device according to the second aspect of the present invention.

The light source control unit is configured in such a way as to be able to make the on period uniformly variable between the light sources of the plurality of colors.

A fifth aspect of the present invention is the display device according to the first aspect of the present invention.

The light source control unit is configured in such a way as to fix a length of an on period of the light sources determined by the first delay time and the second delay time.

A sixth aspect of the present invention is the display device according to any of the first to fifth aspects of the present invention.

The light source control unit includes configuration information that includes the first delay time and the second delay time and that is configured such that color temperature of white luminance displayed by the display unit becomes a certain value.

A seventh aspect of the present invention is the display device according to the sixth aspect of the present invention.

The configuration information further includes a control value for controlling luminance of light emitted by the light sources of each color.

An eighth aspect of the present invention is a method for driving a display device that includes a display unit including a plurality of pixel forming units arranged in a matrix and a light source unit for radiating light onto the display unit, the light source unit including light sources of a plurality of colors capable of controlling an on/off state for each color, that divides one frame period into a plurality of subframe periods, and that displays screens of different colors in accordance with the subframe periods.

The method includes a light source control step of controlling states of the light sources of the plurality of colors.

The light source control step includes a step of delaying a timing at which the on state of the light sources of each color begins from a start timing of a subframe period in which a screen is to be displayed by controlling transmittance of light relating to each color by a first delay time, and a step of delaying a timing at which the off state of the light sources of each color begins from an end timing of the subframe period in which the screen is to be displayed by controlling the transmittance of the light relating to each color by a second delay time.

In the light source control step, the second delay time for delaying the timing at which the off state of the light sources of each color begins is configured in such a way to be shorter than the first delay time for delaying the timing at which the on state of the light sources of a succeeding color, which are to be turned on after the light sources of the foregoing color are turned off, begins.

Advantageous Effects of Invention

According to the first aspect of the present invention, in display of each color, by configuring the second delay time, a period (additional on period) is provided for which the light sources of each color remain turned on until the second delay time has elapsed since the end timing of a subframe period. Therefore, by providing the additional on period, it is possible to secure a longer period in which display is performed in a state close to desired transmittance. In other words, luminance close to a desired value can be achieved for each color. In addition, since the second delay time relating to the light sources for which the off state begins in the preceding subframe period is configured in such a way as to be shorter than the first delay time relating to the light sources for which the on state begins in the succeeding subframe period, a period (all-off period) in which the light sources of all the colors are in the off state is provided. As a result, a period in which the light sources remain turned on while the transmittance is changing becomes shorter. In other words, a period in which the light sources remain turned on while the transmittance is not changing or is not substantially changing becomes relatively long. At this time, the on periods of the light sources can be configured independently of timings at which the subframe period switches. Thus, since a period in which a color corresponding to transmittance and the color of the light sources do not match becomes shorter, mixing of colors can be suppressed. As described above, by providing both the all-off period and the additional on period, desired luminance can be achieved while suppressing mixing of colors.

According to the second aspect of the present invention, since the first delay time and the second delay time are variable, the luminance of the screen can be changed as necessary. As a result, more desirable luminance can be achieved.

According to the third aspect of the present invention, since the on periods of the light sources of the plurality of colors can be different from one another, the value of luminance of each color can be adjusted. Therefore, for example, color balance can be improved.

According to the fourth aspect, the lengths of the on periods of the light sources of the plurality of colors can become the same, and the lengths of these on periods can be variable.

Therefore, for example, the luminance of the screen can be changed as necessary. As a result, more desirable luminance can be achieved.

According to the fifth aspect of the present invention, the same advantageous effects produced by the first aspect of the present invention can be produced through a simple process by using the first delay time and the second delay time fixed for each color.

According to the sixth aspect of the present invention, the light sources are controlled using the first delay time and the second delay time configured such that the color temperature of the white luminance displayed by the display unit becomes the certain value. Therefore, luminance closer to a desired value can be achieved.

According to the seventh aspect of the present invention, the same advantageous effect produced by the sixth aspect of the present invention can be produced by using the control value (for example, a current value) for controlling the luminance of light emitted by the light sources of each color, the control value being set such that the color temperature of the white luminance displayed by the display unit becomes the certain value.

According to the eighth aspect of the present invention, the same advantageous effects produced by the first aspect of the present invention can be produced by the method for driving a display device.

DESCRIPTION OF EMBODIMENTS

First to third embodiments of the present invention will be described hereinafter with reference to the accompanying drawings.

<1. First Embodiment>
<1.1 Overall Configuration and Overview of Operation>

Figure 1:
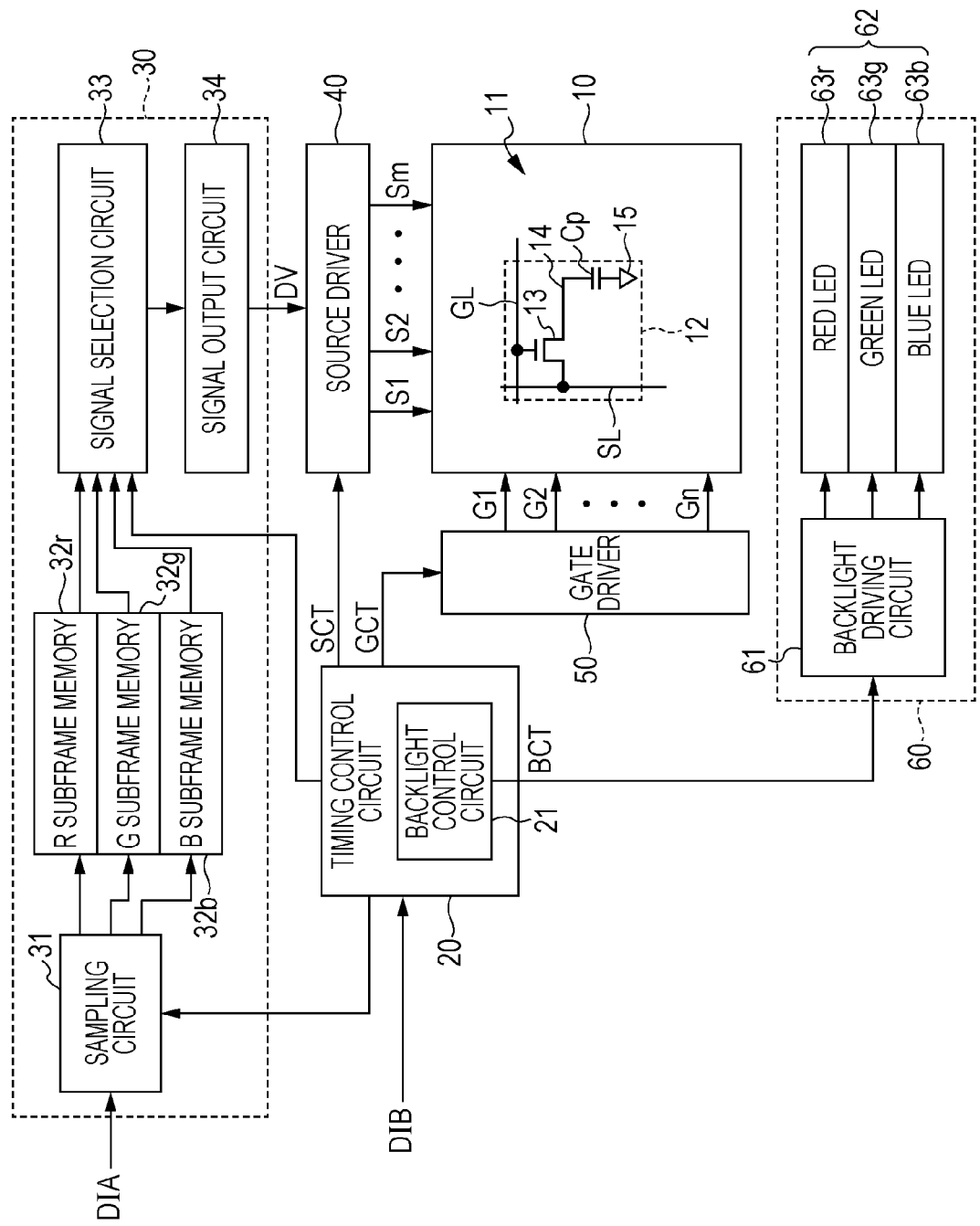
FIG. 1 is a block diagram illustrating the configuration of a liquid crystal display device according to a first embodiment of the present invention.

FIG. 1 is a block diagram illustrating the configuration of a liquid crystal display device adopting a field sequential method according to the first embodiment of the present invention. The liquid crystal display device according to this embodiment performs color display using a field sequential method in which each frame period is divided into three subframe periods. As illustrated in FIG. 1, this liquid crystal display device is configured by a liquid crystal display panel 10, a timing control circuit 20, a subframe image signal generation circuit 30, a source driver 40, a gate driver 50, and a backlight unit 60.

In the following description, for example, one frame period lasts $\frac{1}{60}$ second, and each subframe period lasts $\frac{1}{180}$ second. In addition, assume that a red component (R component), a green component (G component), and a blue component (B component) of an input image signal DIA input to the liquid crystal display device from the outside are each 8-bit data. In this case, the liquid crystal display device can express each of the colors of red, green, and blue using 256 tones, and therefore can display about 16,780,000 colors (to be exact, 256× 256×256 colors) on the liquid crystal display panel 10.

The liquid crystal display panel 10 includes a display section 11. In the display section 11, a plurality of (m) source lines SL1 to SLm, a plurality of (n) gate lines GL1 to GLn, and a plurality of (m×n) pixel forming units 12 provided in correspondence with intersections between these m source lines SL1 to SLm and n gate lines GL1 to GLn are formed. In the following description, when the m source lines SL1 to SLm are not distinguished with one another, the m source lines SL1 to SLm will be referred to as "source lines SL". Similarly, when the n gate lines GL1 to GLn are not distinguished with one another, the n gate lines GL1 to GLn will be referred to as "gate lines GL". In FIG. 1, only one pixel forming unit 12 is illustrated for the sake of convenience. Each pixel forming unit 12 is configured by a TFT (thin-film transistor) 13 whose gate terminal is connected to a gate line GL extending over a corresponding intersection and whose source terminal is connected to a source line SL extending over the intersection, a pixel electrode 14 connected to a drain terminal of the TFT 13, a common electrode 15 provided for the plurality of pixel forming units 12 in common, and a liquid crystal layer provided for the plurality of pixel forming units 12 in common and sandwiched between the pixel electrode 14 and the common electrode 15. In addition, a pixel capacitor Cp is configured by a liquid crystal capacitor formed by the pixel electrode 14 and the common electrode 15. It is to be noted that, in order to secure voltage for the pixel capacitor Cp, an auxiliary capacitor is typically provided parallel to the liquid crystal capacitor.

The timing control circuit 20 controls various components of the liquid crystal display device on the basis of an input timing signal DIB input to the liquid crystal display device from the outside. The timing control circuit 20 includes a backlight control circuit 21 as a light source control unit. It is to be noted that the backlight control circuit 21 will be described later. The timing control circuit 20 controls a sampling circuit 31 and a signal selection circuit 33, which will be described later, in the subframe image signal generation circuit 30. In addition, the timing control circuit 20 controls the source driver 40, the gate driver 50, and the backlight unit 60 by transmitting a source control signal SCT, a gate control signal GCT, and a backlight control signal BCT, respectively, to these components.

The subframe image signal generation circuit 30 includes the sampling circuit 31, subframe memories 32r, 32g, and 32b for R, G, and B, the signal selection circuit 33, and a signal output circuit 34. In the following description, the subframe memories 32r, 32g, and 32b for R, G, and B will be referred to as an "R subframe memory", a "G subframe memory", and a "B subframe memory", respectively. In addition, when the subframe memories 32r, 32g, and 32b for R, G, and B are not distinguished with one another, the subframe memories 32r, 32g, and 32b for R, G, and B will be simply referred to as "subframe memories 32". The sampling circuit 31 samples the input image signal DIA on the basis of the control performed by the timing control circuit 20, and writes the R component of the input image signal DIA to the R subframe memory 32r, the G component to the G subframe memory 32g, and the B component to the B subframe memory 32b. Each subframe memory 32 holds a color component for one subframe period. The signal selection circuit 33 sequentially reads data for one subframe period, namely the R component, the G component, and the B component for one subframe period, from the subframe memories 32r, 32g, and 32b for R, G, and B on the basis of the control performed by the timing control circuit 20, and provides the data for the signal output circuit 34. The signal output circuit 34 performs certain processing (for example, processing for amplifying the color components in accordance with the optical properties of the liquid crystal display panel 10) on the provided color components for one subframe period, and provides a resultant image signal DV for the source driver 40. It is to be noted that the image signal DV may be either a digital signal or an analog signal. Thus, the subframe image signal generation circuit 30 generates the image signal DV in units of subframes.

The source driver 40 generates driving image signals S1 to Sm from the image signal DV received from the signal output circuit 34 of the subframe image signal generation circuit 30 on the basis of the source control signal SCT received from the timing control circuit 20, and applies these signals to the m source lines SL1 to SLm, respectively. It is to be noted that the source driver 40 may be integrally formed with the display section 11.

The gate driver 50 repeats application of active scanning signals G1 to Gn to the n gate lines, respectively, on the basis of the gate control signal GCT received from the timing control circuit 20 in a cycle of one subframe period. It is to be noted that the gate driver 50 may be integrally formed with the display section 11.

The backlight unit 60 includes a backlight driving circuit 61 and an LED (light-emitting diode) unit 62 as a light source unit. The LED unit 62 is configured by arranging the red LEDs 63r, the green LEDs 63g, and the blue LEDs 63b (hereinafter referred to as "LEDs 63" when not distinguished with one another) as light sources in two dimensions. It is to be noted that CCFLs (cold-cathode fluorescent lamps) may be used instead of the LEDs 63. The backlight driving circuit 61 receives the backlight control signal BCT from the above-described backlight control circuit 21. The backlight control signal BCT includes, for example, signals indicating a turning-on delay time as a first delay time and a turning-off delay time as a second delay time of the LEDs 63 of each color, a driving current value as a control value for controlling the luminance of light emitted by the LEDs 63 of each color, and the like (hereinafter these will be collectively referred to as "backlight-related configuration information"). The backlight driving circuit 61 turns on or off the LEDs 63 on the basis of the backlight control signal BCT received from the timing control circuit 20. Power supply current for the LEDs 63 is supplied from a power supply circuit, which is not illustrated. The backlight-related configuration information is, for example, held by a storage unit, which is not illustrated, in the backlight control circuit 21 in advance.

Thus, a screen according to the input image signal DIA is displayed on the liquid crystal display panel 10 when the driving image signals have been applied to the source lines SL, the scanning signals have been applied to the gate lines GL, and radiation of light onto the liquid crystal display panel 10 from the backlight unit 60 has been controlled.

<1.2 Operation>

Figure 2:
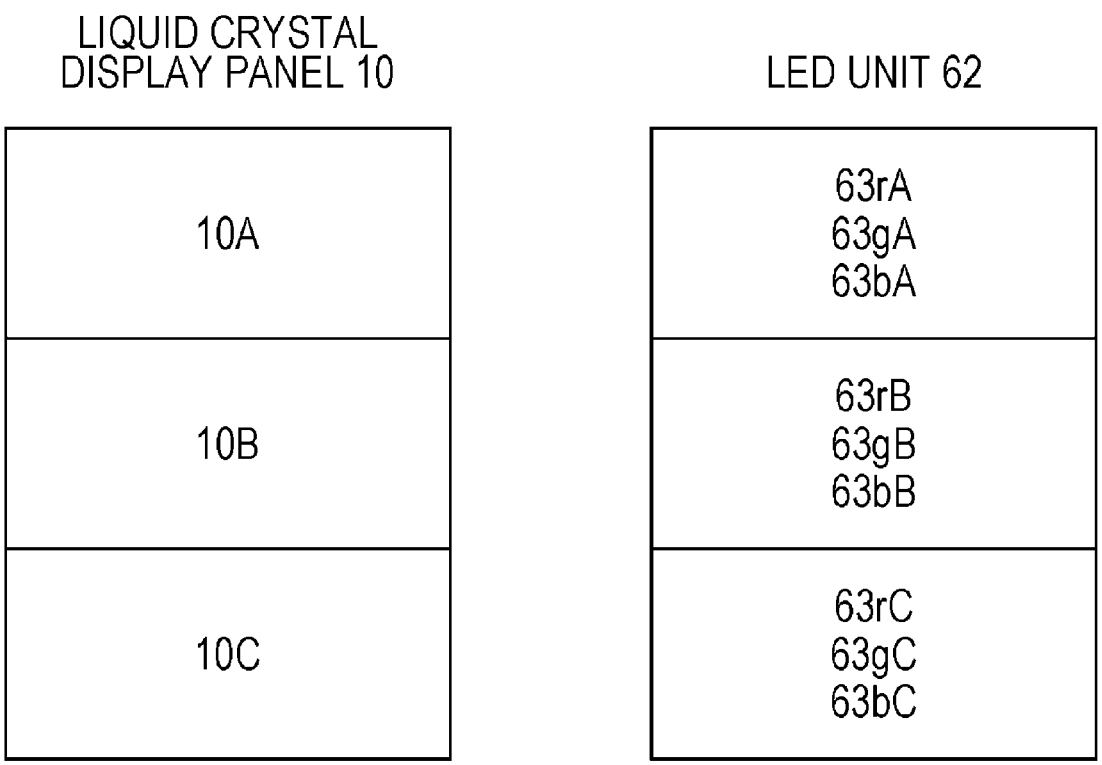
FIG. 2 is a diagram illustrating a liquid crystal display panel and an LED unit according to the first embodiment each divided into three regions.

FIG. 2 is a diagram illustrating the liquid crystal display panel 10 and the LED unit 62 according to this embodiment each divided into three regions as an example. It is to be noted that the number of regions used here is merely an example and the present invention is not limited to this. The liquid crystal display panel 10 is divided into three regions 10A to 10C. The LED unit 62 is divided into three regions 63A (63rA, 63gA, and 63bA), 63B (63rB, 63gB, and 63bB), and 63C (63rC, 63gC, and 63bC). The three regions 10A to 10C of the liquid crystal display panel 10 correspond to the three regions 63A to 63C, respectively, of the LED unit 62. It is to be noted that color changes from R to G, and then to B in one frame period.

For example, a case in which red is displayed will be described. When a certain period of time (time necessary for the liquid crystal to optically respond) has elapsed since driving image signals of the R component were supplied to all pixel forming units 12 included in the region 10A of the liquid crystal display panel 10, all red LEDs 63rA included in the region 63A of the LED unit 62 turn on. Next, when a certain period of time has elapsed since driving image signals of the R component were supplied to all pixel forming units 12 included in the region 10B of the liquid crystal display panel 10, all red LEDs 63rB included in the region 63B of the LED unit 62 turn on. Next, when a certain period of time has elapsed since driving image signals of the R component were supplied to all pixel forming units 12 included in the region 10C of the liquid crystal display panel 10, all red LEDs 63rC included in the region 63C of the LED unit 62 turn on. Thus, the red LEDs 63rA to 63rC sequentially turn on in accordance with the driving timings of the liquid crystal display panel 10. Thereafter, when a certain period of time has elapsed since the turning on of the red LEDs 63rA to 63rC, the red LEDs 63rA to 63rC sequentially turn off. The same holds true for a case in which green is displayed and a case in which blue is displayed, and accordingly description of such cases is omitted. It is to be noted that in the following description, the region 10A of the liquid crystal display panel 10 and the region 63A of the LED unit 62 will be collectively referred to as a "first region", the region 10B of the liquid crystal display panel 10 and the region 63B of the LED unit 62 will be collectively referred to as a "second region", and the region 10C of the liquid crystal display panel 10 and the region 63C of the LED unit 62 will be collectively referred to as a "third region".

Figure 3:
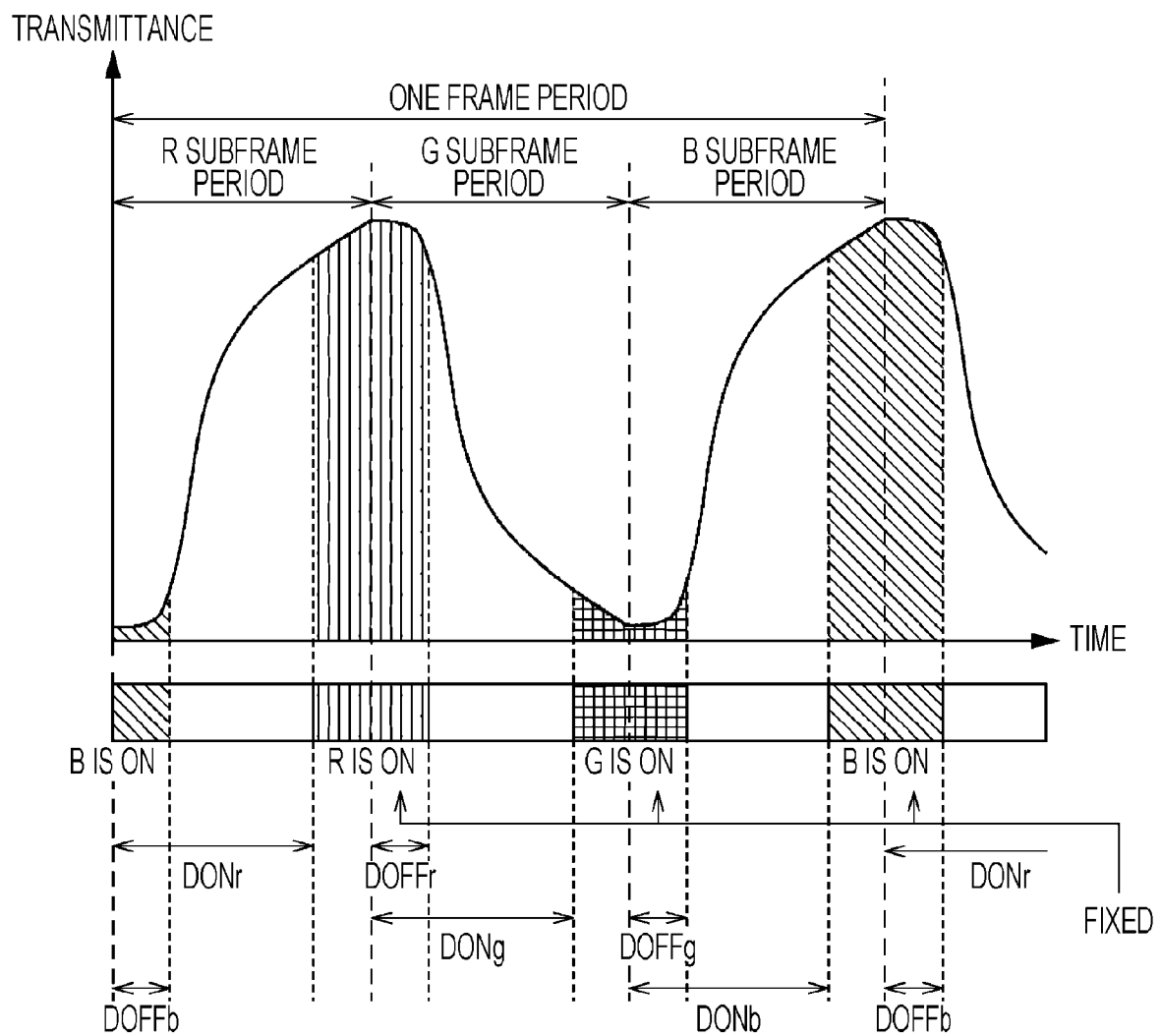
FIG. 3 is a diagram illustrating the operation of the liquid crystal display device according to the first embodiment.

Next, a timing of turning on and a timing of turning off of each color will be described in detail with reference to FIG. 3. FIG. 3 is a diagram illustrating the operation of the liquid crystal display device according to this embodiment. In FIG. 3, a horizontal axis represents time, and a vertical axis represents transmittance. Here, luminance corresponds to a time integral of an on period of light sources of each color and transmittance in the on period. Subframe periods in which screens are displayed by controlling the transmittance of light relating to red, green, and blue will be referred to as an "R subframe period", a "G subframe period", and a "B subframe period", respectively, herein. A start timing of the subframe period of each color illustrated in FIG. 3 is a timing at which the driving image signals of each color component begins to be supplied to the pixel forming units 12 (more specifically, the pixel capacitors Cp) in each of the first to third regions. In addition, an end timing of the subframe period of each color is a timing at which the supply of the driving image signals of each color component to the pixel forming units 12 ends in each of the first to third regions. Thus, in a strict sense, the start timings and the end timings of the subframe periods differ between the first to third regions (that is, in a strict sense, a start timing and an end timing of one frame period also differ between the first to third regions). In the following description, however, whether the description is based on the optical response of liquid crystal in the first, second, or third region is not particularly identified for the sake of convenience.

First, display of red will be described. Since, in general, the response speed of liquid crystal is relatively low, it takes some time to achieve desired transmittance after the beginning of the R subframe period. That is, transmittance at the end of the B subframe period, which is a preceding subframe period, continues for a while after the beginning of the R subframe period. Therefore, the timing at which the red LEDs 63r are turned on is delayed from the start timing of the R subframe period by the turning-on delay time, which corresponds to a period within which the liquid crystal can sufficiently respond. In the following description, the turning-on delay time relating to the red LEDs 63r will be referred to as an "R turning-on delay time", and denoted by a code "DONr". Thereafter, the red LEDs 63r remain turned on even after the end timing of the R subframe period. The red LEDs 63r then switch to an off state when the turning-off delay time has elapsed since the start timing of the G subframe period, which is a succeeding subframe period of the R subframe period. Red is thus displayed. In the following description, the turning-off delay time relating to the red LEDs 63r will be referred to as an "R turning-off delay time", and denoted by a code "DOFFr".

Next, display of green will be described. Transmittance at the end of the R subframe period, which is the preceding subframe period, continues for a while after the beginning of the G subframe period. Therefore, the timing at which the green LEDs 63g are turned on is delayed from the start timing of the G subframe period by the turning-on delay time, which corresponds to the period within which the liquid crystal can sufficiently respond. In the following description, the turning-on delay time relating to the green LEDs 63g will be referred to as a "G turning-on delay time", and denoted by a code "DONg". Thereafter, the green LEDs 63g remain turned on even after the end timing of the G subframe period. The green LEDs 63g then switch to the off state when the turning-off delay time has elapsed since the start timing of the B subframe period, which is the succeeding subframe period of the G subframe period. Green is thus displayed. In the following description, the turning-off delay time relating to the green LEDs 63g will be referred to as a "G turning-off delay time", and denoted by a code "DOFFg".

Next, display of blue will be described. Transmittance at the end of the G subframe period, which is the preceding subframe period, continues for a while after the beginning of the B subframe period. Therefore, the timing at which the blue LEDs 63b are turned on is delayed from the start timing of the B subframe period by the turning-on delay time, which corresponds to the period within which the liquid crystal can sufficiently respond. In the following description, the turning-on delay time relating to the blue LEDs 63b will be referred to as a "B turning-on delay time", and denoted by a code "DONb". Thereafter, the blue LEDs 63b remain turned on even after the end timing of the B subframe period. The blue LEDs 63b then switch to the off state when the turning-off delay time has elapsed since the start timing of the R subframe period, which is the succeeding subframe period of the B subframe period. Blue is thus displayed. In the following description, the turning-off delay time relating to the blue LEDs 63b will be referred to as a "B turning-off delay time", and denoted by a code "DOFFb".

Color display for one frame period is performed by sequentially performing the display of red, the display of green, and the display of blue described above. In this embodiment, in display of each color, a period (hereinafter referred to as an "additional on period") is provided for which the light sources of each color remain turned on until the turning-off delay time has elapsed since the end timing of the corresponding subframe period. In this additional on period, the driving image signals of the color component for the succeeding subframe period have begun to be supplied to the pixel forming units 12, but since the response of the liquid crystal is slow, transmittance in the preceding subframe period is continuing. That is, by providing the additional on period, it is possible to secure a longer period in which display is performed in a state close to desired transmittance. In other words, luminance close to a desired value can be achieved for each color. It is to be noted that it is possible to provide a period corresponding to the additional on period relating to each color immediately before the original on period. In the period immediately before the original on period, however, the liquid crystal transmittance is still changing to a desired value, and therefore achieved luminance is far from the desired value compared to this embodiment.

In addition, the turning-off delay time relating to the LEDs 63 for which the off state begins in the preceding subframe period is shorter than the turning-on delay time relating to the LEDs 63 for which the on state begins in the succeeding subframe period. More specifically, the R turning-off delay time DOFFr is shorter than the G turning-on delay time DONg, the G turning-off delay period DOFFg is shorter than the B turning-on delay time DONb, and the B turning-off delay time DOFFb is shorter than the R turning-on delay time DONr. Therefore, a period (hereinafter referred to as an "all-off period") is provided between a period (hereinafter referred to as an "R on period") in which the red LEDs 63r are in the on state and a period (hereinafter referred to as a "G on period") in which the green LEDs 63g are in the on state, an all-off period is provided between the G on period and a period (hereinafter referred to as a "B on period") in which the blue LEDs 63b are in the on state, and an all-off period is provided between the B on period and the R on period. As a result, a period in which the LEDs 63 remain turned on while the transmittance is changing becomes shorter. In other words, a period in which the LEDs 63 remain turned on while the transmittance is not changing or is not substantially changing becomes relatively long. At this time, the on periods of the LEDs 63 can be configured independently of timings at which the subframe period switches. Thus, since a period in which a color corresponding to transmittance and the color of the LEDs 63 do not match becomes shorter, mixing of colors can be suppressed. It is to be noted that the length of the R on period is determined by the R turning-on delay time DONr and the R turning-off delay time DOFFr, the length of the G on period is determined by the G turning-on delay time DONg and the G turning-off delay time DOFFg, and the length of the B on period is determined by the B turning-on delay time DONb and the B turning-off delay time DOFFb.

Now, the backlight-related configuration information according to this embodiment is configured, for example, in the following manner. First, in a state in which white is displayed over the entirety of the screen of the liquid crystal display panel 10, the driving current value of the LEDs 63 of each color is set such that a luminance value becomes largest while checking a luminance meter or the like. Next, the set driving current value of the LEDs 63 of each color is readjusted and the turning-on delay time and the turning-off delay time are adjusted with the on period of the LEDs 63 of each color kept constant such that the color temperature of the displayed white screen becomes a certain value (for example, 6,500 K) while checking the luminance meter or the like. As described above, the driving current value, the turning-on delay time, and the turning-off delay time of the LEDs 63 of each color determined by the above procedure are held by the storage unit, which is not illustrated, in the backlight control circuit 21. In this embodiment, the R on period, the G on period, and the B on period determined by their respective turning-on delay times and turning-off delay times are uniformly configured in such a way as to have the same length, and the lengths of these on periods are a fixed value. The length of each on period is, for example, half the length of one subframe period. However, this length is merely an example, and the present invention is not limited to this.

<1.3 Advantageous Effects>

According to this embodiment, the additional on period is provided by configuring the turning-off delay time with respect to the display of each color in the liquid crystal display device adopting the field sequential method. In addition, since the turning-off delay time of the LEDs 63 for which the off start begins in the preceding subframe period is configured in such a way as to be shorter than the turning-on delay time for the LEDs 63 for which the on start begins in the succeeding subframe period, an all-off period is provided. Thus, by providing both the all-off periods and the additional on periods, desired luminance is achieved while suppressing mixing of colors.

In addition, according to this embodiment, the backlight-related configuration information (the driving current value, the turning-on delay time, and the turning-off delay time of the LEDs 63 of each color) configured such that the color temperature of white luminance becomes a certain value is held by the backlight control circuit 21 in advance. The turning on and off of the LEDs 63 is controlled on the basis of this backlight-related configuration information. Therefore, luminance closer to a desired value can be achieved.

In addition, according to this embodiment, the R on period, the G on period, and the B on period are uniformly configured in such a way as to have the same length and the lengths of these on periods are a fixed value. Therefore, the present invention can be realized through a simple process.

<2. Second Embodiment>

<2.1 Operation>

Figure 4:
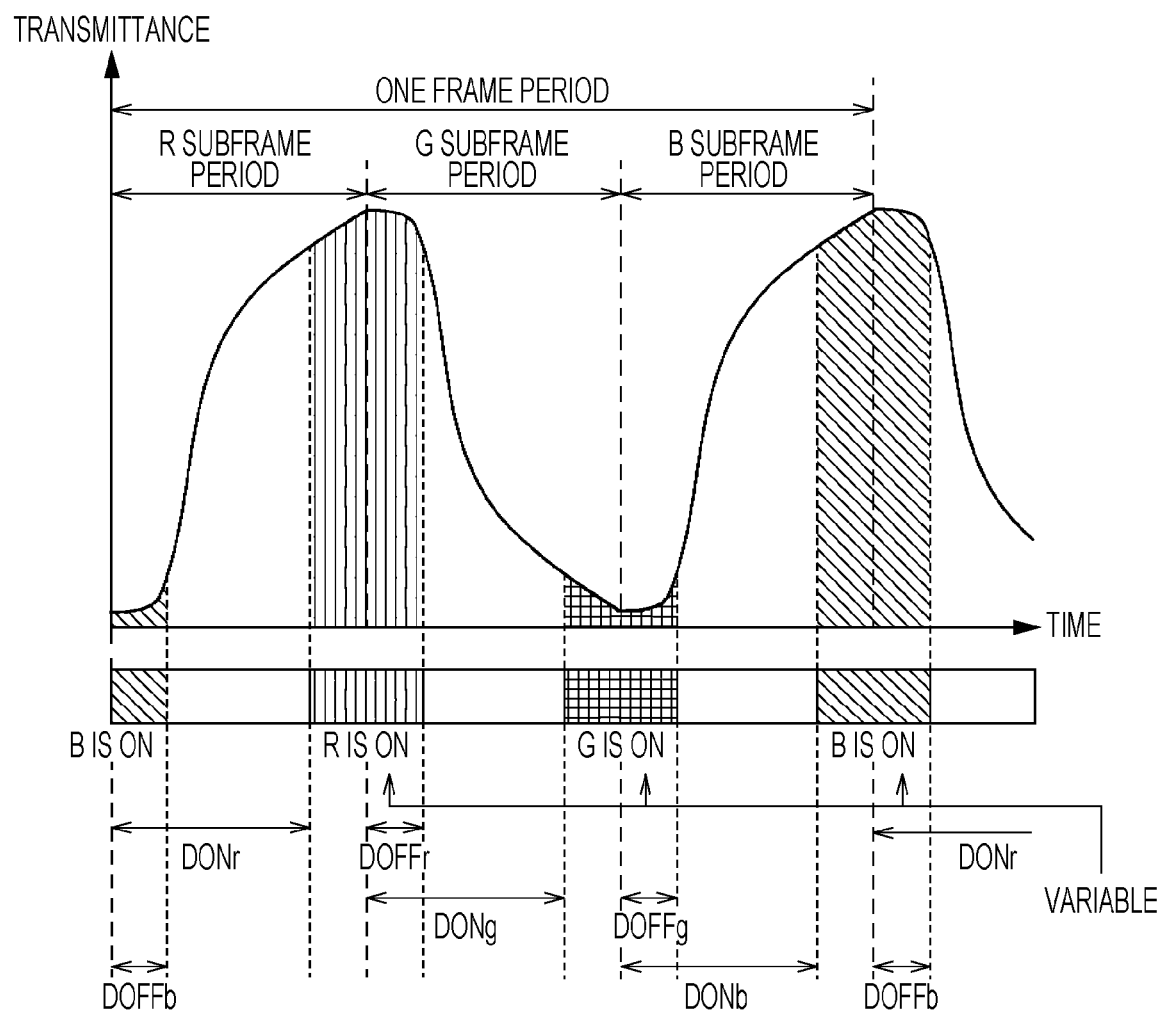
FIG. 4 is a diagram illustrating the operation of a liquid crystal display device according to a second embodiment.

FIG. 4 is a diagram illustrating the operation of a liquid crystal display device according to the second embodiment of the present invention. It is to be noted that this embodiment is the same as the first embodiment except for the configuration of the lengths of the on periods, and accordingly description of the same elements is omitted. In the first embodiment, the R on period, the G on period, and the B on period are uniformly configured in such a way as to have the same length and the lengths of these on periods are a fixed value. In contrast, whereas the R on period, the G on period, and the B on period in this embodiment are uniformly configured in such a way as to have the same length, the lengths of these on periods are variable. In addition, the driving current value of the LEDs 63 of each color may be changed as necessary in accordance with a change in the length of each on period.

A method for changing the length of each on period is not particularly limited. For example, the length of each on period can be changed by changing the turning-on delay time and the turning-off delay time held by the storage unit in the backlight control circuit 21 from the outside on the basis of a signal (for example, a signal included in the input timing signal). Alternatively, the length of each on period may be changed by mounting a sensor for detecting environmental brightness on the liquid crystal display device and changing the turning-on delay time and the turning-off delay time held by the storage unit in the backlight control circuit 21 on the basis of information indicating the environmental brightness obtained by the sensor. One of other various methods may be adopted as the method for changing the length of each on period, instead. It is to be noted that a method for changing the driving current value of the LEDs 63 of each color is the same as the method for changing the length of each on period.

<2.2 Advantageous Effects>

According to this embodiment, the lengths of the R on period, the G on period, and the B on period become the same, and the lengths of these on periods become variable. Therefore, for example, the luminance of the screen can be changed as necessary. As a result, more desirable luminance can be achieved.

<3. Third Embodiment>

<3.1 Operation>

Figure 5:
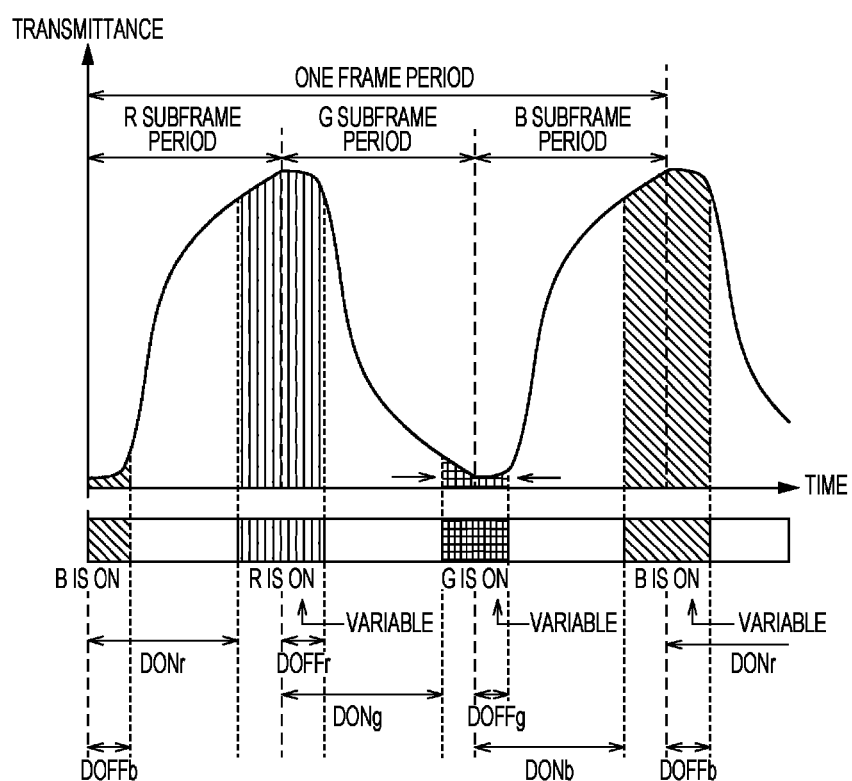
FIG. 5 is a diagram illustrating the operation of a liquid crystal display device according to a third embodiment.
Figure 6:
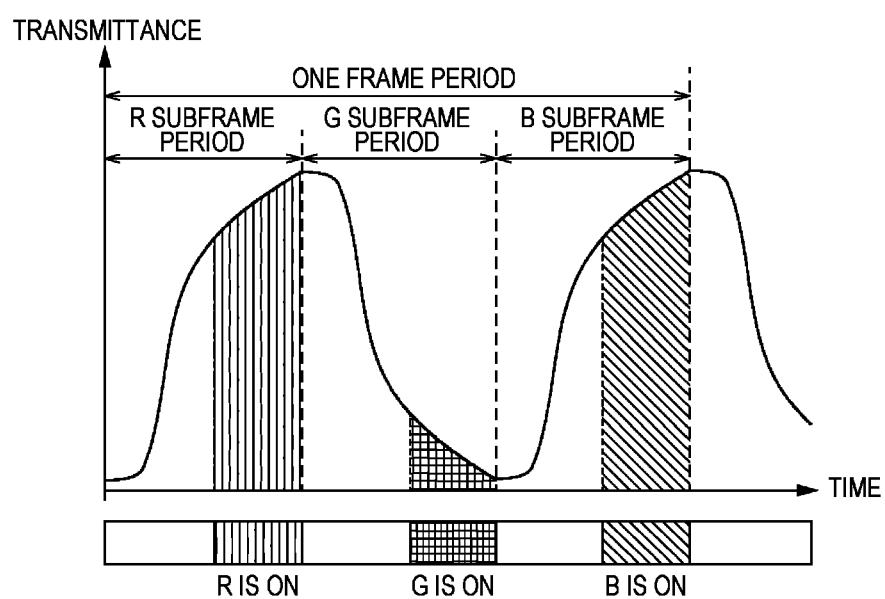
FIG. 6 is a diagram illustrating the operation of a liquid crystal display device at a time when a first existing method is used.
Figure 7:
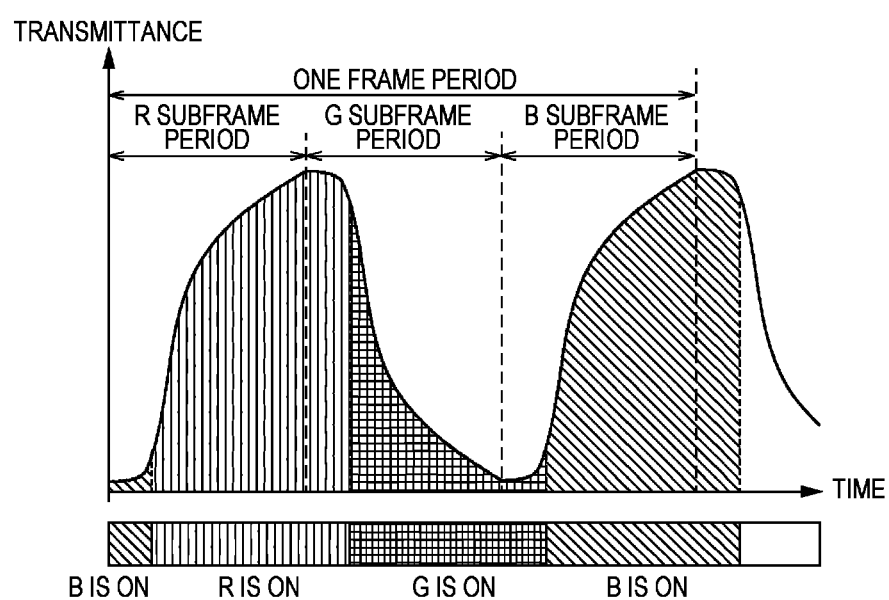
FIG. 7 is a diagram illustrating the operation of the liquid crystal display device at a time when a second existing method is used.

FIG. 5 is a diagram illustrating the operation of a liquid crystal display device according to the third embodiment of the present invention. It is to be noted that this embodiment is the same as the first or second embodiment except for the configuration of the lengths of the on periods, and accordingly description of the same elements is omitted. In the second embodiment, the R on period, the G on period, and the B on period are uniformly configured in such a way as to have the same length, and the lengths of these on periods are variable. In contrast, the R on period, the G on period, and the B on period in this embodiment can have different lengths. In addition, as in the second embodiment, the driving current value of the LEDs 63 of each color may be changed as necessary in accordance with a change in the length of each on period.

In the first and second embodiments, the lengths of the R on period, the G on period, and the B on period are the same, and, for example, the lengths are each half the length of one subframe period. In contrast, in this embodiment, for example, the lengths of the R on period, the G on period, and the B on period can be half, two-fifth, and half the length of one subframe period, respectively. It is to be noted that the lengths of the R on period, the G on period, and the B on period are merely examples, and the lengths can be changed to various values as necessary. As in the second embodiment, the method for changing the length of each on period is not particularly limited in this embodiment.

For example, the backlight-related configuration information in this embodiment is configured in the following manner. In a state in which white is displayed over the entirety of the liquid crystal display panel 10, the driving current value of the LEDs 63 of each color is adjusted and the turning-on delay time and the turning-off delay time of the LEDs 63 of each color are adjusted such that the color temperature of the displayed white screen becomes a certain value (for example, 6,500 K) while checking the luminance meter or the like. As described above, the driving current value, the turning-on delay time, and the turning-off delay time of the LEDs 63 of each color determined by the above procedure are held by the storage unit, which is not illustrated, in the backlight control circuit 21.

<3.2 Advantageous Effects>

According to this embodiment, since the R on period, the G on period, and the B on period can become different from one another, the value of luminance of each of the colors of R, G, and B can be adjusted. Therefore, for example, color balance can be improved.

<4. Others>

Although the above embodiments have been described while taking an example in which the LEDs 63 of three colors are incorporated into the LED unit 62, the present invention is not limited to this. For example, LEDs 63 of four colors or more may be incorporated into the LED unit 62.

In addition, although the above embodiments have been described while taking a liquid crystal display device as an example, the present invention is not limited to this. The present invention may be applied to a display device other than the liquid crystal display device insofar as the display device includes a light source unit including a plurality of light sources and adopts a scheme in which the color of light sources in the on state is switched in accordance with the subframe period. In addition, the above embodiments may be modified in various ways and implemented without deviating from the scope of the present invention.

Thus, according to the present invention, a display device that adopts a field sequential method and that is capable of achieving desired luminance while suppressing mixing of colors and a method for driving the display device can be provided.

REFERENCE SIGNS LIST 10 liquid crystal display panel
11 display unit
12 pixel forming unit
20 timing control circuit
21 backlight control circuit (light source control unit)
30 subframe image signal generation circuit
40 source driver
50 gate driver
60 backlight unit (light source unit)
61 backlight driving circuit
62 LED unit
63 LED (light source)
DON turning-on delay time (first delay time)
DOFF turning-off delay time (second delay time)
SL source line
GL gate line

The invention claimed is:

1. A display device that divides one frame period into a plurality of subframe periods and that displays screens of different colors in accordance with the subframe periods, the display device comprising:
   a display unit, including a plurality of pixel forming units arranged in a matrix;
   a light source unit, to radiate light onto the display unit, the light source unit including light sources of a plurality of colors capable of controlling an on/off state for each color; and
   a light source control unit to control states of the light sources of the plurality of colors by being configured to
      delay a timing at which the on state of the light sources of each color begins from a start timing of a subframe period in which a screen is to be displayed by controlling transmittance of light relating to each color by a first delay time, and
      delay a timing at which the off state of the light sources of each color begins from an end timing of the subframe period in which the screen is to be displayed by controlling the transmittance of the light relating to each color by a second delay time,
   wherein the second delay time for delaying the timing at which the off state of the light sources of each color begins is configured to be relatively shorter than the first delay time for delaying the timing at which the on state of the light sources of a succeeding color, to be turned on after the light sources of the foregoing color are turned off, begins, and a length of an on period of the light sources determined by the first delay time and the second delay time is configured to be variable,
   wherein the light source control unit, to control states of the light sources of the plurality of colors, includes configuration information, including the first delay time and the second delay time,
   wherein color temperature of white luminance displayed by the display unit is based on the first delay time and the second delay time, and
   wherein the first delay time and the second delay time are configured such that the color temperature of the white luminance displayed by the display unit becomes a certain value.

2. The display device according to claim 1, wherein the light source control unit is configured in such a way as to be able to make the on period different between the light sources of the plurality of colors.

3. The display device according to claim 1, wherein the light source control unit is configured in such a way as to be able to make the on period uniformly variable between the light sources of the plurality of colors.

4. The display device according to claim 1, wherein the configuration information further includes a control value for controlling luminance of light emitted by the light sources of each color.

5. A method for driving a display device including a display unit including a plurality of pixel forming units arranged in a matrix and a light source unit to radiate light onto the display unit, the light source unit including light sources of a plurality of colors capable of controlling an on/off state for each color, to divide one frame period into a plurality of subframe periods, and to display screens of different colors in accordance with the subframe periods, the method comprising:
   controlling states of the light sources of the plurality of colors, including
      delaying a timing at which the on state of the light sources of each color begins from a start timing of a subframe period in which a screen is to be displayed by controlling transmittance of light relating to each color by a first delay time, and
      delaying a timing at which the off state of the light sources of each color begins from an end timing of the subframe period in which the screen is to be displayed by controlling the transmittance of the light relating to each color by a second delay time,
   wherein, in the controlling of the states of the light sources of the plurality of colors, the second delay time for delaying the timing at which the off state of the light sources of each color begins is configured to be relatively shorter than the first delay time for delaying the timing at which the on state of the light sources of a succeeding color, to be turned on after the light sources of the foregoing color are turned off, begins, and a length of an on period of the light sources determined by the first delay time and the second delay time is configured in to be variable,
   wherein the controlling of the states of the light sources of the plurality of colors includes configuration information that includes the first delay time and the second delay time,
   wherein color temperature of white luminance displayed by the display unit is based on the first delay time and the second delay time, and
   wherein the first delay time and the second delay time are configured such that the color temperature of the white luminance displayed by the display unit becomes a certain value.

* * * * *